(12) United States Patent
Nakanishi et al.

(10) Patent No.: US 11,901,690 B2
(45) Date of Patent: Feb. 13, 2024

(54) FIBER LASER DEVICE

(71) Applicant: Fujikura Ltd., Tokyo (JP)

(72) Inventors: Yasuo Nakanishi, Sakura (JP);
Yasuhiro Mashiko, Sakura (JP);
Shinichi Sakamoto, Sakura (JP);
Kensuke Shima, Sakura (JP)

(73) Assignee: Fujikura Ltd., Tokyo (JP)

( * ) Notice: Subject to any disclaimer, the term of this patent is extended or adjusted under 35 U.S.C. 154(b) by 411 days.

(21) Appl. No.: 17/416,873

(22) PCT Filed: Feb. 21, 2020

(86) PCT No.: PCT/JP2020/007066
§ 371 (c)(1),
(2) Date: Jun. 21, 2021

(87) PCT Pub. No.: WO2020/171205
PCT Pub. Date: Aug. 27, 2020

(65) Prior Publication Data
US 2022/0085565 A1    Mar. 17, 2022

(30) Foreign Application Priority Data

Feb. 21, 2019 (JP) .................................. 2019-029366

(51) Int. Cl.
*H01S 3/067* (2006.01)
*H01S 3/16* (2006.01)
*H01S 3/00* (2006.01)

(52) U.S. Cl.
CPC .......... *H01S 3/0675* (2013.01); *H01S 3/0078* (2013.01); *H01S 3/06716* (2013.01); *H01S 3/1618* (2013.01)

(58) Field of Classification Search
CPC ................. H01S 3/0675; H01S 3/0078; H01S 3/08018–0805
See application file for complete search history.

(56) References Cited

U.S. PATENT DOCUMENTS 5,805,621 A * 9/1998 Grubb ................... H01S 3/0675
372/102
5,930,435 A * 7/1999 Laming ................... H01S 5/146
385/126

(Continued)

FOREIGN PATENT DOCUMENTS

CN       103746278 A     4/2014
CN       105009387 A    10/2015

(Continued)

OTHER PUBLICATIONS

Jauregui, Cesar, et. al. "Physical origin of mode instabilities in high-power fiber laser systems", Optics Express, vol. 20, No. 12, 2012, pp. 12912-12925 (14 pages).

(Continued)

*Primary Examiner* — Joshua King
(74) *Attorney, Agent, or Firm* — Osha Bergman Watanabe & Burton LLP (57) ABSTRACT

A fiber laser device includes a pumping light source, an amplifying fiber, an input side fiber fusion-spliced on an input side of the amplifying fiber and formed with a HR-FBG, an output side fiber fusion-spliced on an output side of the amplifying fiber and formed with an OC-FBG having a reflectivity smaller than that of the HR-FBG, an output end, and a mode filter, wherein the input side fiber or an intermediate fiber disposed between the amplifying fiber and the input side fiber is fusion-spliced with the amplifying fiber via a fusion splice portion, and at least a portion of the mode filter is disposed in a region between the fusion splice portion and a position separated from the fusion splice portion by a coherence length of beating caused by mode interference of signal light propagating in the amplifying fiber.

6 Claims, 4 Drawing Sheets

(56) References Cited

U.S. PATENT DOCUMENTS

| | | | |
|---|---|---|---|
| 2004/0057471 A1* | 3/2004 | Shevy | H01S 3/067 372/6 |
| 2008/0095199 A1* | 4/2008 | Abramczyk | G02B 6/14 372/6 |
| 2009/0161701 A1* | 6/2009 | Furuya | G02B 6/262 372/6 |
| 2011/0058250 A1 | 3/2011 | Liu et al. | |
| 2014/0036938 A1* | 2/2014 | Nakai | H01S 3/10015 372/6 |
| 2015/0295381 A1* | 10/2015 | Luo | G02B 6/02209 372/6 |
| 2016/0006205 A1* | 1/2016 | Kashiwagi | G02B 6/02323 372/6 |
| 2016/0181756 A1* | 6/2016 | Muendel | H01S 3/06754 372/6 |
| 2020/0161826 A1* | 5/2020 | Mimuro | H01S 3/0804 |

FOREIGN PATENT DOCUMENTS

| | | | | |
|---|---|---|---|---|
| CN | 109038187 A | * | 12/2018 | H01S 3/06712 |
| EP | 3477348 A1 | | 5/2019 | |
| EP | 3745193 A1 | * | 12/2020 | G02F 1/365 |
| JP | 2008205161 A | * | 9/2008 | |
| JP | 2008205161 A | | 9/2008 | |
| JP | 2010003896 A | | 1/2010 | |
| JP | 2010197730 A | | 9/2010 | |
| JP | 2012238781 A | | 12/2012 | |
| JP | 2013242309 A | | 12/2013 | |
| JP | 2014225584 A | | 12/2014 | |
| JP | 2016129222 A | * | 7/2016 | H01S 3/06708 |
| JP | 2018041792 A | | 3/2018 | |
| JP | 2018190834 A | | 11/2018 | |
| WO | 9932909 A1 | | 7/1999 | |
| WO | WO-2005074573 A2 | * | 8/2005 | G02B 6/105 |
| WO | 2009057309 A1 | | 5/2009 | |
| WO | 2014141766 A1 | | 9/2014 | |
| WO | 2018003604 A1 | | 1/2018 | |
| WO | 2018207615 A1 | | 11/2018 | |

OTHER PUBLICATIONS

International Search Report issued in corresponding International Application No. PCT/JP2020/007066, dated May 26, 2020, with English translation (7 pages).

* cited by examiner

FIBER LASER DEVICE

TECHNICAL FIELD

The present invention relates to a fiber laser device.

This application claims priority based on Japanese Patent Application No. 2019-029366 filed in Japan on Feb. 21, 2019, of which the contents are incorporated herein by reference.

BACKGROUND ART

Patent Document 1 discloses a fiber laser device that includes a pumping light source that outputs pumping light, an amplifying fiber doped with an active element such as Yb, a HR-FBG, and an OC-FBG. One plausible method of increasing the output of such a fiber laser device is to cause single-mode oscillation in a multimode amplifying fiber to remove limitations such as nonlinear optical effects.

PATENT LITERATURE

Patent Document 1: JP 2018-190834 A

In a fiber laser device using a multimode amplifying fiber, one factor that prevents improving the quality of a beam is transverse mode instability (TMI), which is also referred to as thermal modal instability. TMI is a phenomenon in which, when the power of pumping light fed into the amplifying fiber is increased, the conversion efficiency from the pumping light into a laser beam is reduced due to heat and linearity is lost. When this phenomenon occurs, mode coupling from the fundamental mode to a higher-order mode occurs, reducing the beam quality of the laser beam. Furthermore, by higher-order mode laser beams being amplified, the energy contributing to the amplification of fundamental mode laser beams is reduced. Thus, the amplification efficiency of the fundamental mode laser beams is reduced.

In Patent Document 1, there is no mention of TMI, and thus there is room for improvement in terms of both improving beam quality and increasing amplification efficiency.

SUMMARY

One or more embodiments of the invention provide a fiber laser device that can improve beam quality and increase amplification efficiency.

A fiber laser device according to one or more embodiments of the invention includes: a pumping light source configured to output pumping light; an amplifying fiber including a core doped with a rare earth element excitable by the pumping light from the pumping light source; an input side fiber fusion-spliced on an input side of the amplifying fiber and formed with a HR-FBG; an output side fiber fusion-spliced on an output side of the amplifying fiber and formed with an OC-FBG, the OC-FBG having a reflectivity smaller than a reflectivity of the HR-FBG; an output end configured to output a laser beam; and a mode filter configured to remove at least a portion of a predetermined higher-order mode from the core of the amplifying fiber, wherein the input side fiber or an intermediate fiber disposed between the amplifying fiber and the input side fiber is fusion-spliced with the amplifying fiber via a fusion splice portion, and at least a portion of the mode filter is disposed in a region between the fusion splice portion and a position separated from the fusion splice portion by a coherence length of beating caused by mode interference of signal light propagating in the amplifying fiber.

According to one or more embodiments the fiber laser device, the mode filter provided near the fusion splice portion where higher-order modes are caused in the resonator is used to remove unnecessary higher-order modes at an early stage and reduce the light amount of higher-order modes in the amplifying fiber. This makes it possible to reduce the beat modulation degree that affects the amplitude of the thermal grating. Accordingly, TMI can be suppressed. By suppressing TMI in this manner, mode coupling from the fundamental mode to a higher-order mode can be suppressed, and the beam quality of the laser beam can be improved. In addition, among the energy input by the pumping light source, the proportion of energy that helps amplify fundamental mode laser beams can be prevented from decreasing. As a result, fundamental mode amplification efficiency can be increased and the output can be increased.

Moreover, compared to a configuration in which, for example, the peak wavelength of the pumping light is offset from the absorption peak wavelength of the amplifying fiber, the intensity of the laser beams emitted from the output end is not easily decreased in this configuration. Thus, the output of the fiber laser device can be increased.

Here, the predetermined higher-order mode may be a mode of a higher order than the LP01 or a mode of a higher order than the LP11. In this case, the output of the fiber laser device can be further increased.

Moreover, the fiber laser device according to one or more embodiments, may further include an outer side mode filter disposed between the output side fiber and the output end, the outer side mode filter being configured to restrict a mode of the laser beam output from the output end.

The mode filter may remove at least a higher-order mode that is a target for restriction by the outer side mode filter.

In this case, the mode filter removes, from the amplifying fiber, unnecessary modes that are the targets for restriction by the outer side mode filter. This helps prevent the unnecessary modes from being amplified in the amplifying fiber, and allows the conversion efficiency from pumping light to laser beams to be further improved. Removing the unnecessary modes by two filters, i.e., the mode filter and the outer side mode filter, allows unnecessary modes to be reliably removed from the laser beams that are ultimately emitted. This allows beam quality to be further improved.

Moreover, the fiber laser device according to one or more embodiments, may further include a reinforcing member configured to reinforce the fusion splice portion, wherein the mode filter may be configured by bending the amplifying fiber from an end portion of the reinforcing member on the output side.

In this case, the fusion splice portion can be reinforced by the reinforcing member. Furthermore, the mode filter is disposed as close to the fusion splice portion as practically possible. This increases the effect of suppressing TMI.

Moreover, the core of the amplifying fiber may be doped with Yb, and the pumping light output by the pumping light source may include light of wavelengths ranging from 970 to 980 nm.

In this case, by matching the absorption peak wavelength (976 nm) of the amplifying fiber doped with Yb with the peak wavelength of the pumping light, the pumping light can be even more efficiently converted into laser beams.

According to one or more embodiments of the invention described above, a fiber laser device that can improve beam quality and increase amplification efficiency can be provided.

DETAILED DESCRIPTION

First Embodiment

A fiber laser device of a first embodiment will be described below with reference to the drawings.

Figure 1:
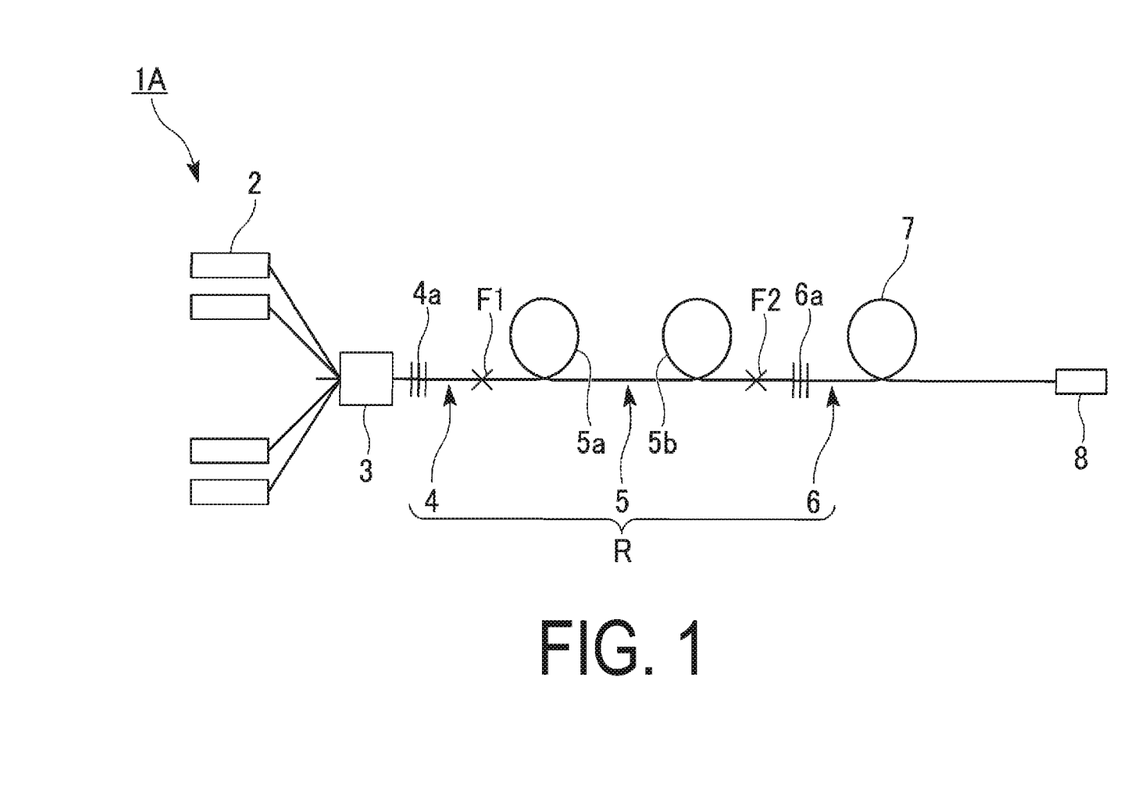
FIG. 1 is a block diagram illustrating the configuration of a fiber laser device according to a first embodiment.

As illustrated in FIG. 1, a fiber laser device 1A includes a plurality of pumping light sources 2, a combiner 3, an input side fiber 4, an amplifying fiber 5, an output side fiber 6, an outer side mode filter 7, and an output end 8. The amplifying fiber 5, the input side fiber 4, and the output side fiber 6 form an optical device R. The optical device R is a resonator that generates laser beams via pumping light emitted by the pumping light sources 2. Note that the optical device R may include other components (e.g., the outer side mode filter 7, the output end 8, and the like).

The fiber laser device 1A of the present embodiment is a monodirectional pumping (forward pumping) laser device with no backward pumping light source.

Definition of Directions

In the present specification, with reference to the amplifying fiber 5, the side where the pumping light sources 2 are disposed is referred to as the input side, and the side where the output end 8 is disposed is referred to as the output side.

Laser diodes or the like can be used as the pumping light sources 2. The combiner 3 combines the pumping light emitted from the pumping light sources 2 in a single optical fiber, where the light then enters the input side fiber 4. The end portion of the input side fiber 4 on the input side is connected to the combiner 3. The end portion of the input side fiber 4 on the output side is fusion-spliced with the amplifying fiber 5 via a fusion splice portion F1.

Note that the input side fiber 4 and the amplifying fiber 5 may be spliced to one another via an intermediate fiber (not illustrated). The end portions of the intermediate fiber are fusion-spliced with the input side fiber 4 and the amplifying fiber 5. In this case, the fusion splice portion between the intermediate fiber and the amplifying fiber 5 corresponds to the fusion splice portion F1.

The end portion of the amplifying fiber 5 on the output side is fusion-spliced with the output side fiber 6 via a fusion splice portion F2. Although not illustrated in the drawings, the fusion splice portions F1 and F2 are held by highly rigid reinforcing members to help prevent bending and the like. Reinforcing the fusion splice portions F1 and F2 with the reinforcing members can also help prevent breaks in the fusion splice portions F1 and F2, for example.

A high reflectivity-fiber Bragg grating (HR-FBG) 4a is formed in the core of the input side fiber 4. The HR-FBG 4a is adjusted to reflect, from among light emitted by the active elements of the amplifying fiber 5 in an excited state, light having the wavelength of signal light with approximately 100% reflectivity. The HR-FBG 4a has a structure in which a portion with a high refractive index is repeatedly disposed at certain intervals in the longitudinal direction of the input side fiber 4.

An output coupler-fiber Bragg grating (OC-FBG) 6a is formed in the core of the output side fiber 6. The OC-FBG 6a has a structure similar to that of the HR-FBG 4a. However, the OC-FBG 6a is adjusted to reflect signal light at a lower reflectivity than the HR-FBG 4a.

The amplifying fiber 5 includes a core doped with one type or two or more types of active elements, a first cladding that covers the core, a second cladding that covers the first cladding, and a protective coating that covers the second cladding. The amplifying fiber 5 is a double-clad fiber. Examples of the active elements with which the core is doped include rare earth elements such as erbium (Er), ytterbium (Yb), and neodymium (Nd). These active elements emit light in an excited state. Silica glass or the like can be used as the core and the first cladding. A resin such as a polymer resin can be used as the second cladding. A resin material such as acrylic resin or silicone resin can be used as the protective coating.

The amplifying fiber 5 is a so-called few-mode optical fiber and is capable of propagating a plurality of modes.

In the amplifying fiber 5, the signal light reflected at the HR-FBG 4a and the OC-FBG 6a travels back and forth in the longitudinal direction of the amplifying fiber 5. The signal light is amplified by traveling back and forth and forms a laser beam. Thus, in the resonator R, light is amplified, and a laser beam is generated. A portion of the laser beam passes through the OC-FBG 6a and reaches the output end 8 via the outer side mode filter 7. Unnecessary higher-order modes included in the laser beam are removed by the outer side mode filter 7. Here, unnecessary higher-order modes included in the laser beam are, for example, modes other than the fundamental mode (LP01) and the LP11 and modes of a higher order than the fundamental mode. Moreover, the outer side mode filter 7 may remove all of the unnecessary higher-order modes but is only required to remove the unnecessary higher-order modes at least partially. Examples of the unnecessary higher-order modes include a mode of a higher order than the LP01 and a mode of a higher order than the LP11.

In this manner, the outer side mode filter 7 functions to ultimately restrict the modes included in the laser beam emitted from the output end 8.

The outer side mode filter 7 may be configured by bending a portion of the output side fiber 6. Alternatively, another type of filter capable of selectively removing higher-order modes may be used as the outer side mode filter 7, and this outer side mode filter 7 may be fusion-spliced with the output side fiber 6.

As described above, the amplifying fiber 5 is a fiber that is different from the input side fiber 4 in which the HR-FBG 4a is formed and is different from the output side fiber 6 in which the OC-FBG 6a is formed. Thus, the fusion splice portions F1 and F2 are provided on the end portions of the amplifying fiber 5.

In one or more embodiments, higher-order modes that are the cause of TMI occur at the fusion splice portion F1 and that providing a mode filter 5a near the fusion splice portion F1 inside the amplifying fiber 5 is effective in suppressing TMI. The following is a more detailed description.

Qualitative inquiries into TMI have been carried out, as seen for example in: Physical origin of mode instabilities in high-power fiber laser systems; Optics Express, Vol. 20, Issue 12, pp. 12912-12925. In one or more embodiments, the phenomenon in the resonator includes steps (1) to (6) described below, in the case of TMI.
   (1) Beating is caused by mode interference between the fundamental mode and a higher-order mode in the amplifying fiber 5. Note that "beating" refers to the undulation of light intensity in the forward direction in which light propagates in the amplifying fiber 5.
   (2) The generated beating causes quantum defects in the pumping light, which in turn causes thermal grating. Note that herein, thermal grating refers to a temperature variation in the longitudinal direction of the amplifying fiber 5.
   (3) The thermal grating causes a long period grating due to the thermal-refractive index dependency of the fiber, resulting in mode coupling from the fundamental mode to a higher-order mode.
   (4) The mode coupling decreases the fundamental mode and increases higher-order modes, and also the amplitude (temperature difference between the high temperature portion and the low temperature portion) of the thermal grating is increased.
   (5) The increase in the amplitude of the thermal grating further advances the mode coupling, which decreases the fundamental mode and increases higher-order modes.
   (6) (4) and (5) described above are repeated.

Accordingly, as time passes, the mode coupling from the fundamental mode to a higher-order mode cumulatively advances, and the proportion of higher-order modes with a large loss due to bending in the fiber laser device 1A or splice between fibers is increased. Thus, the total amount of loss up to the output end 8 is increased.

Some plausible parameters that affect the generation of thermal grating in TMI as described above can be identified. Herein, the parameters are represented as follows:
   $\Delta T$: Amplitude of thermal grating (temperature difference between the high temperature portion and the low temperature portion)
   $\alpha$pump: Absorption rate of pumping light in the amplifying fiber 5
   Ppump: Power of pumping light input into the amplifying fiber 5
   a: Ratio of signal light density and pumping light density
   $\omega$: Beat modulation degree (difference or ratio of peak and valley in the undulation of light intensity in the amplifying fiber 5 caused by mode interference)

When considering a state where the signal light loss is sufficiently smaller than the heat generated by the quantum defects caused by pumping light absorption and the signal light amount is sufficiently greater than the amount of pumping light, the following relationship for the parameters is considered to be satisfied.

$$\Delta T \propto (\alpha\text{pump} \times P\text{pump}) \div a \times \omega$$

That is, by reducing the beat modulation degree $\omega$, it is conceivable that $\Delta T$ can be reduced.

Considering steps (1) to (6) described above, an effective way of reducing the beat modulation degree $\omega$ is to remove higher-order modes of light in the amplifying fiber 5 at an early stage.

For this reason, the amplifying fiber 5 of the present embodiment includes the mode filter 5a. The mode filter 5a removes unnecessary higher-order modes (e.g., modes other than the fundamental mode (LP01) and the LP11, or modes of a higher order than the fundamental mode) from the core of the amplifying fiber 5. Moreover, the mode filter 5a may remove all of the unnecessary higher-order modes but is only required to remove the unnecessary higher-order modes at least partially. Examples of the unnecessary higher-order modes include a mode of a higher order than the LP01 and a mode of a higher order than the LP11. Various configurations may be selected for the mode filter 5a. However, for example, the mode filter 5a may be a portion of the amplifying fiber 5 that is bent with a predetermined curvature so as to remove higher-order modes.

Unlike the outer side mode filter 7, the mode filter 5a is provided inside the optical device R, i.e., the resonator. Note that a length adjustment unit 5b of the amplifying fiber 5 is a portion that simply adjusts the length of the amplifying fiber 5 by winding the amplifying fiber 5 at a gentle curvature so that loss due to bending does not occur. The length adjustment unit 5b does not have a function of removing a specific mode, unlike the mode filter 5a.

According to one or more embodiments, the mode filter 5a is disposed near the fusion splice portion F1, i.e., the section where higher-order modes occur. The reasons for this are described below. In a device such as the fiber laser device 1A of the present embodiment, longitudinal modes (oscillation wavelength) are typically multimodes in order to curb nonlinear optical effects. Thus, although a higher-order mode is developed from the fundamental mode (LP01) irrespective of wavelength at the fusion splice portion F1, as waves are guided, coherence is lost due to the difference in propagation speed of each wavelength. In other words, at a section separated from the fusion splice portion F1 by the coherence length or greater, the fundamental mode and higher-order modes lose coherence. Thus, the thermal grating is reduced, resulting in coupling to a higher-order mode being reduced. Even if higher-order modes are removed at the section separated by the coherence length or greater, because coupling to higher-order modes has occurred in sections up to the section separated by the coherence length or greater, from the perspective of suppressing a decrease in efficiency, an effect is unlikely to be achieved. For this reason, the mode filter 5a is disposed in the amplifying fiber 5 near the fusion splice portion F1, according to one or more embodiments.

According to one or more embodiments, the mode filter 5a is provided in the optical device R, i.e., the resonator, and the interval between the fusion splice portion F1 and the mode filter 5a is less than the coherence length, which is a persistence length of beating caused by the mode interference in the light having the wavelength of the signal light propagating in the amplifying fiber 5. According to one or more embodiments, at least a portion of the mode filter 5a is disposed in a region between the fusion splice portion F1 and a position separated from the fusion splice portion F1 by a coherence length of beating caused by the mode interference of the signal light propagating in the amplifying fiber 5. In addition, in a case where the fusion splice portion F1 is held by a reinforcing member, a bend insufficient to cause a microbend is provided in the amplifying fiber 5 from a section directly after the end portion of the reinforcing member on the output side, according to one or more embodiments.

As described above, the fiber laser device 1A of the present embodiment includes pumping light sources 2 for outputting pumping light; an amplifying fiber 5 including a core doped with a rare earth element excitable by the pumping light from the pumping light sources 2; the input side fiber 4 fusion-spliced on the input side of the amplifying fiber 5 and formed with the HR-FBG 4a; the output side fiber 6 fusion-spliced on the output side of the amplifying fiber 5 and formed with the OC-FBG 6a, the OC-FBG 6a having a reflectivity smaller than a reflectivity of the HR-FBG 4a; the output end 8 for outputting a laser beam; the outer side mode filter 7 provided between the output side fiber 6 and the output end 8, the outer side mode filter 7 restricting a mode of the laser beams output from the output end 8; and the mode filter 5a for removing at least a portion of a predetermined higher-order mode from the core of the amplifying fiber 5. Moreover, the input side fiber 4 or the intermediate fiber disposed between the amplifying fiber 5 and the input side fiber 4 is fusion-spliced with the amplifying fiber 5 via the fusion splice portion F1, and at least a portion of the mode filter 5a is disposed in a region between the fusion splice portion F1 and a position separated from the fusion splice portion F1 by the coherence length of beating caused by mode interference of the signal light propagating in the amplifying fiber 5.

According to this configuration, the mode filter 5a provided near the fusion splice portion F1 where higher-order modes are caused in the resonator is used to remove unnecessary higher-order modes at an early stage and reduce the light amount of higher-order modes in the amplifying fiber 5. This allows the beat modulation degree w that affects the amplitude ΔT of the thermal grating to be reduced. Accordingly, TMI can be suppressed. By suppressing TMI in this manner, mode coupling from the fundamental mode to a higher-order mode can be suppressed, and the beam quality of the laser beam can be improved. In addition, among the energy input by the pumping light sources 2, the proportion of energy that helps amplify fundamental mode laser beams can be prevented from decreasing. As a result, fundamental mode amplification efficiency can be increased, and the output of the fiber laser device 1A can be increased. Compared to a related-art configuration in which the peak wavelength of the pumping light is offset from the absorption peak wavelength of the amplifying fiber 5, the intensity of the laser beams emitted from the output end 8 is not easily decreased in this configuration. Thus, the output of the fiber laser device 1A can be increased.

Moreover, the predetermined higher-order modes removed by the mode filter 5a may be modes of a higher order than the LP01 or modes of a higher order than the LP11. In this case, the output of the fiber laser device can be further increased.

The mode filter 5a may be configured to remove at least higher-order modes that are the targets for restriction by the outer side mode filter 7. Alternatively, the higher-order modes that are the targets for removal may be the same for the mode filter 5a and the outer side mode filter 7. The mode filter 5a removes, from the amplifying fiber 5, the unnecessary modes that are the targets for restriction by the outer side mode filter 7 in this manner, which thus helps prevent the unnecessary modes from being amplified in the amplifying fiber 5. This allows the conversion efficiency from pumping light to laser beams to be further improved. Removing the unnecessary modes with two filters, i.e., the mode filter 5a and the outer side mode filter 7, allows unnecessary modes to be reliably removed from the laser beams that are ultimately emitted. This allows beam quality to be further improved.

Furthermore, the mode filter 5a may be configured by bending the amplifying fiber 5 from the end portion on the output side of the reinforcing member that reinforces the fusion splice portion F1. In this case, the fusion splice portion F1 is reinforced and the mode filter 5a is disposed as close to the fusion splice portion F1 as practically possible. This increases the effect of suppressing TMI.

Furthermore, the core of the amplifying fiber 5 may be doped with Yb, and the light output by the pumping light sources 2 may include light of wavelengths ranging from 970 to 980 nm. In this manner, by matching the absorption peak wavelength (976 nm) of the amplifying fiber 5 doped with Yb with the peak wavelength of the pumping light, the pumping light can be even more efficiently converted into laser beams.

Furthermore, the optical device R may be constituted by the amplifying fiber 5, the input side fiber 4, the output side fiber 6, and the mode filter 5a that removes a predetermined higher-order mode from the core of the amplifying fiber 5. By using the optical device R with such a configuration, a fiber laser device with the operational effects described above can be achieved.

Second Embodiment

Next, a second embodiment according to the invention will be described. However, the basic configuration is the same as that of the first embodiment. For this reason, similar components are given the same reference sign and descriptions thereof are omitted. Only the differences will be described.

Figure 2:
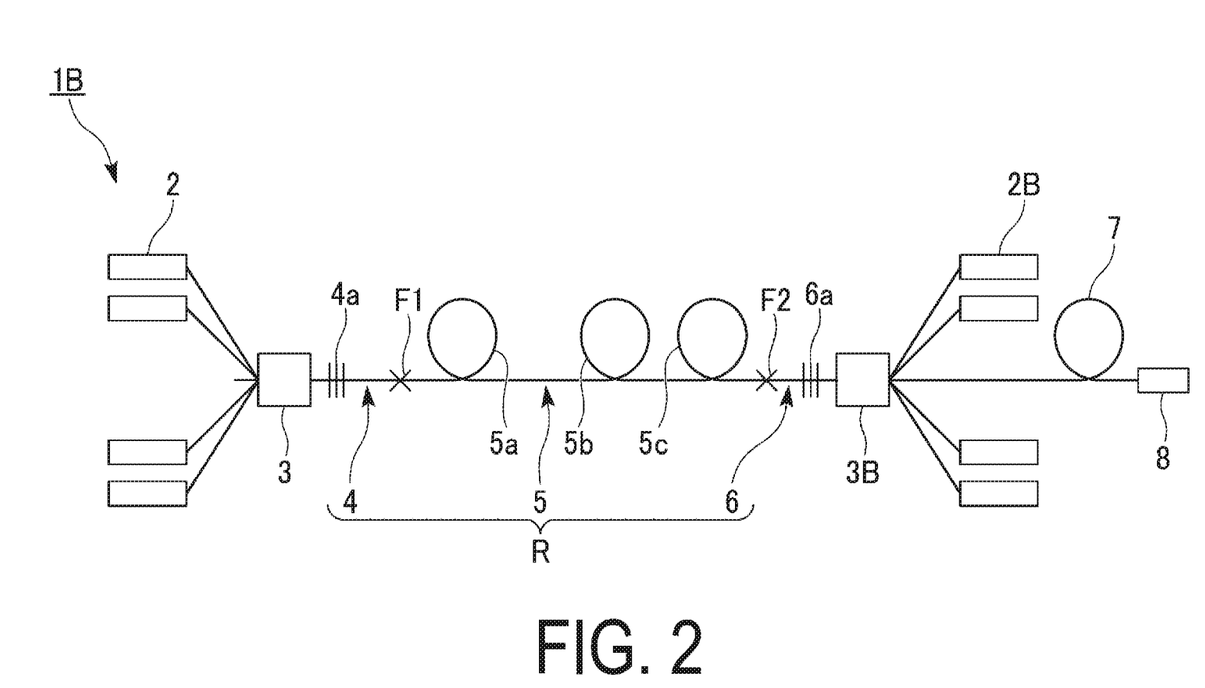
FIG. 2 is a block diagram illustrating the configuration of a fiber laser device according to a second embodiment.

A fiber laser device 1B of the present embodiment is a bidirectional pumping laser with a backward pumping light source.

As illustrated in FIG. 2, the fiber laser device 1B of the present embodiment further includes a second combiner 3B and backward pumping light sources 2B. The amplifying fiber 5 of the present embodiment includes the first mode filter 5a and the length adjustment unit 5b, as well as a second mode filter 5c.

The backward pumping light sources 2B are disposed on the output side relative to the optical device R. In the present embodiment, the forward pumping light sources 2 emit forward pumping light toward the amplifying fiber 5, and the backward pumping light sources 2B emit backward pumping light toward the amplifying fiber 5. As with the forward pumping light sources 2, laser diodes can be used as the backward pumping light sources 2B.

The second combiner 3B combines the pumping light emitted from the backward pumping light sources 2B in a single optical fiber and guides the light toward the amplifying fiber 5. Note that the optical fiber in which the combined pumping light of the backward pumping light sources 2B propagates and the amplifying fiber 5 may be spliced to one another via an intermediate fiber (not illustrated). In this case, the fusion splice portion between the intermediate fiber and the amplifying fiber 5 corresponds to the fusion splice portion F2.

In the present embodiment, the second mode filter 5c is disposed at a position near the fusion splice portion F2 on the inner side of the optical device R, i.e., the resonator. Specifically, at least a portion of the second mode filter 5c is disposed in a region between the fusion splice portion F2 and a position separated from the fusion splice portion F2 by a coherence length of beating caused by the mode interference of the signal light propagating in the amplifying fiber 5. Similar to the first mode filter 5a, the second mode filter 5c removes unnecessary higher-order modes that occur at the fusion splice portion F2. Note that although the configuration of the second mode filter 5c is not described in detail herein, the second mode filter 5c can have a similar configuration to that of the first mode filter 5a.

According to the bidirectional pumping fiber laser device of the present embodiment, the mode filters 5a and 5c provided in the resonator are used to remove unnecessary higher-order modes and reduce the light amount of higher-order modes in the amplifying fiber 5. This allows the beat modulation degree w that affects the amplitude ΔT of the thermal grating to be reduced. Accordingly, TMI can be suppressed.

EXAMPLES

One or more embodiments described above will now be described using detailed examples. Note that the invention is not limited to the following examples.

In an example, the fiber laser device 1A with the configuration illustrated in FIG. 1 was prepared. The reflectivity of the HR-FBG 4a was 99%, and the reflectivity of the OC-FBG 6a was 10%. As the outer side mode filter 7, a mode filter was used that removed modes other than the LP01 and the LP11 and restricted the modes output from the output end 8 to the LP01 and the LP11. Yb was used as an additive with which the core of the amplifying fiber 5 was doped. The mode filter 5a was configured by bending the portion of the amplifying fiber 5 directly after the fusion splice portion F1 at a predetermined curvature. Here, at least a portion of the mode filter 5a was disposed in a region between the fusion splice portion F1 and a position separated from the fusion splice portion F1 by a coherence length of beating caused by the mode interference of the signal light propagating in the amplifying fiber 5.

Figure 4:
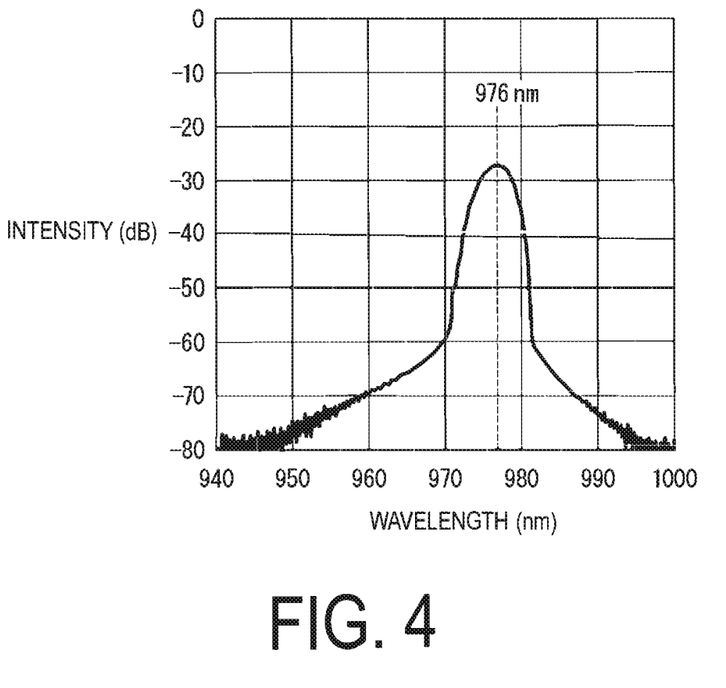
FIG. 4 is a graph showing the intensity distribution for individual wavelengths of pumping light in the fiber laser device according to each of the example and the comparative example.

As the pumping light sources 2, light sources were used that emitted pumping light with the intensity distribution illustrated in FIG. 4. As illustrated in FIG. 4, in the present example, the wavelength at which the intensity of the pumping light peaked was 976 nm. The pumping light also contained light with wavelengths ranging from 970 to 980 nm.

In a comparative example, a fiber laser device with no mode filter 5a was prepared. The fiber laser device was the same as the fiber laser device 1A of the example described above in other respects.

The fiber laser devices of the example and comparative example described above were measured in terms of the relationship between the power of the pumping light input to the amplifying fiber 5 and the conversion efficiency from the pumping light to laser beams. The result of this measurement will be described below.

Figure 3:
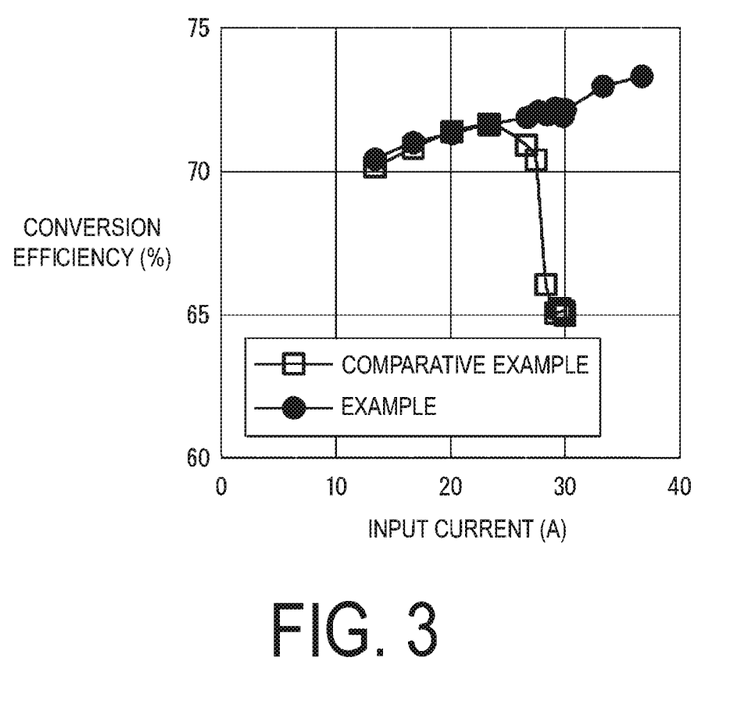
FIG. 3 is a graph showing the relationship between an input current and conversion efficiency for a fiber laser device according to each of an example and a comparative example.

FIG. 3 is a graph showing the relationship between the input current value and the conversion efficiency for the fiber laser device of each of the example and the comparative example. The horizontal axis in FIG. 3 is the current value (A) input to the pumping light sources 2. The higher the input current value, the greater the power of the pumping light input to the amplifying fiber 5. The vertical axis in FIG. 3 is the conversion efficiency (%) from pumping light to laser beams.

As shown in FIG. 3, with the fiber laser device of the comparative example, linearity between the input current value and the conversion efficiency stops at a point where the input current value exceeds 30 A, and a steep decline in conversion efficiency can be seen.

In contrast, with the fiber laser device 1A of the example, linearity is essentially maintained between the input current value and the conversion efficiency even after the input current value exceeds 30 A. Accordingly, a decrease in conversion efficiency can be suppressed.

In the present example and comparative example, the pumping light used included light of wavelengths ranging from 970 to 980 nm, with the intensity peak being 976 nm. This wavelength (976 nm) matches with the absorption peak wavelength in the amplifying fiber 5 doped with Yb. Thus, the cause of the reduction in conversion efficiency in the comparative example is thought to be TMI, as described above, caused by thermal grating due to beating. On the other hand, in the example, extra higher-order modes have been removed by the mode filter 5a. This is thought to have suppressed the formation of thermal grating due to beating.

In this manner, the effects of using the mode filter 5a to remove unnecessary higher-order modes was confirmed.

Method for Calculating Coherence Length

In the fiber laser device 1A, the beam quality of the laser beam can be improved by reducing the interval between the fusion splice portion F1 and the mode filter 5a to less than the coherence length calculated using the mathematical equation described below. A method for calculating the coherence length will be described below using specific values.

Propagation waves E01 and E02 of two discretionary modes can be represented by the following Mathematical Equations (1) and (2), where propagation constant β, the difference in the propagation constant β of the two modes is defined as Δβ, and the average of the propagation constants β of the two modes is defined as βave. (A is a constant, and Z will be described in detail below)

$$E01 = A\sin(\beta ave + \Delta\beta/2)Z = A\sin\beta aveZ\cos(\Delta\beta/2 \times Z) - A\cos\beta aveZ\sin(\Delta\beta/2 \times Z) \quad (1)$$

$$E02 = A\sin(\beta ave - \Delta\beta/2)Z = A\sin\beta aveZ\cos(\Delta\beta/2 \times Z) + A\cos\beta aveZ\sin(\Delta\beta/2 \times Z) \quad (2)$$

From Mathematical Equations (1) and (2), the following relationship is established for the propagation waves E01 and E02.

$$E01 + E02 \propto \sin\beta aveZ\cos(\Delta\beta/2 \times Z) \quad (3)$$

In Mathematical Equation (3), the first member $\sin\beta aveZ$ represents a typical wave, and the second member $\cos(\Delta\beta/2 \times Z)$ represents oscillation of the beating.

Looking at the second member of Mathematical Equation (3), the oscillation of the beating, we can define a Z that satisfies $\Delta\beta/2 \times Z = 2\pi$ as a beat length λb. λ is the propagation wavelength λ of the optical fiber. Here, the beat length kb is represented by the following.

$$\lambda b = 4\pi/\lambda\Delta \quad (4)$$

The propagation wavelength λ and an effective refractive index Neff have the following relationship.

$$\beta = 2\pi\lambda \times Neff \quad (5)$$

Thus, with the difference of the effective refractive index Neff between the two modes defined as ΔNeff, Mathematical Equations (4) and (5) can give the following.

$$\lambda b = 2\lambda/\Delta Neff \quad (6)$$

Moreover, using the width Δλb of the beat length, a coherence length Lc, i.e., the beat persistence length, can be given as the following.

$$Lc = (\lambda b)^2/\Delta\lambda b \quad (7)$$

Using Mathematical Equation (6), Mathematical Equation (7) can be expressed as the following.

$$Lc = (\lambda b)^2/\Delta\lambda b = 2/\Delta Neff \times (\lambda)^2/\Delta\lambda \quad (8)$$

For example, in a case of the fiber laser device 1A where the relative refractive index difference in the amplifying fiber 5 is 0.3%, the core medium refractive index is 1.45, the core diameter is 50 μm, the propagation wavelength λ is 1070 nm, and the wavelength width Δλ is 1 nm, the ΔNeff between the LP01 mode and the LP02 mode at this time is 0.00028. From Mathematical Equation (8), the coherence length Lc, which is the beat persistence length, is calculated to be 8.18 m.

Additionally, in the fiber laser device 1B, the interval between the fusion splice portion F1 and the first mode filter 5a and the interval between the fusion splice portion F2 and the second mode filter 5c may be shorter than the coherence length calculated using the mathematical equations described above.

Note that the technical scope of the invention is not limited to the embodiments described above, and various modifications can be made without departing from the spirit of the invention.

For example, the fiber laser device 1A of FIG. 1 includes the plurality of pumping light sources 2. However, the number of pumping light sources 2 may be one. In this case, the combiner 3 need not be provided.

Moreover, it is only required that at least portions of the mode filters 5a and 5c be disposed in regions between the fusion splice portions F1 and F2 and positions separated from the fusion splice portions F1 and F2 by a coherence length of beating caused by the mode interference of the signal light propagating in the amplifying fiber 5, respectively.

Furthermore, in the fiber laser devices 1A and 1B, the amplifying fiber 5 includes the mode filters 5a and 5c. However, for example, the mode filters 5a and 5c may be disposed between the HR-FBG 4a and the fusion splice portion F1 and between the OC-FBG 6a and the fusion splice portion F2, respectively.

Components of the embodiments described above may be substituted with known components as appropriate and the embodiments described above and modified examples may be combined as appropriate without departing from the spirit of the invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B Fiber laser device
2 Pumping light source
4 Input side fiber
4a HR-FBG
5 Amplifying fiber
5a Mode filter
6 Output side fiber
6a OC-FBG
7 Outer side mode filter
8 Output end
R Optical device

The invention claimed is:

1. A fiber laser device, comprising:
a pumping light source that outputs pumping light;
an amplifying fiber comprising a core doped with a rare earth element excitable by the pumping light;
an input side fiber that is fusion-spliced on an input side of the amplifying fiber and that comprises a high reflectivity-fiber Bragg grating (HR-FBG);
an output side fiber that is fusion-spliced on an output side of the amplifying fiber and that comprises an output coupler-fiber Bragg grating (OC-FBG),
having a reflectivity smaller than a reflectivity of the HR-FBG;
an output end that outputs a laser beam; and
a mode filter that removes at least a portion of a predetermined higher-order mode from the core of the amplifying fiber,
wherein
the input side fiber or an intermediate fiber disposed between the amplifying fiber and the input side fiber is fusion-spliced with the amplifying fiber via a fusion splice portion, and
at least a portion of the mode filter is disposed between the fusion splice portion and a position distant from the fusion splice portion by a coherence length of beating caused by mode interference of signal light propagating in the amplifying fiber.

2. The fiber laser device according to claim 1, wherein an order of the predetermined higher-order mode is higher than LP01 or LP11.

3. The fiber laser device according to claim 1, further comprising: an outer side mode filter that:
is disposed between the output side fiber and the output end, and
restricts a mode of the laser beam output from the output end.

4. The fiber laser device according to claim 3, wherein the mode filter removes at least a higher-order mode that is restricted by the outer side mode filter.

5. The fiber laser device according to claim 1, further comprising:
a reinforcing member that reinforces the fusion splice portion, wherein
the mode filter bends the amplifying fiber from an end portion of the reinforcing member on the output side.

6. The fiber laser device according to claim 1, wherein the core of the amplifying fiber is doped with Yb; and
the pumping light source outputs pumping light of wavelengths ranging from 970 to 980 nm.

* * * * *